United States Patent
Takechi et al.

(10) Patent No.: US 8,461,733 B2
(45) Date of Patent: Jun. 11, 2013

(54) POWER SUPPLY UNIT-INTEGRATED DYNAMOELECTRIC MACHINE

(75) Inventors: Atsushi Takechi, Chiyoda-ku (JP); Dai Nakajima, Chiyoda-ku (JP); Hitoshi Isoda, Chiyoda-ku (JP); Masahiko Fujita, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 322 days.

(21) Appl. No.: 12/845,878

(22) Filed: Jul. 29, 2010

(65) Prior Publication Data

US 2011/0193432 A1 Aug. 11, 2011

(30) Foreign Application Priority Data

Feb. 10, 2010 (JP) ................................ 2010-027349

(51) Int. Cl.
| H02K 5/18 | (2006.01) |
| H02K 9/06 | (2006.01) |
| H02K 11/04 | (2006.01) |

(52) U.S. Cl.
USPC ............. 310/68 D; 310/62; 310/64; 310/257; 310/263

(58) Field of Classification Search
CPC ...... H02K 11/042; H02K 11/046; H02K 19/36
USPC ............................. 310/62, 64, 68 D, 257, 263
IPC ..................... H02K 5/18, 9/06, 11/04
See application file for complete search history.

(56) References Cited

U.S. PATENT DOCUMENTS

| 4,757,221 A | * | 7/1988 | Kurihashi et al. ............... 310/62 |
| 7,414,339 B2 | * | 8/2008 | Kitamura et al. ........... 310/68 D |
| 7,570,488 B2 | * | 8/2009 | Oohashi et al. ............... 361/694 |
| 7,656,134 B2 | * | 2/2010 | Lybbert ........................... 322/28 |
| 2007/0035185 A1 | * | 2/2007 | Asao et al. ...................... 310/58 |
| 2007/0035186 A1 | * | 2/2007 | Asao et al. ...................... 310/58 |
| 2007/0040531 A1 | * | 2/2007 | Oohashi et al. ............... 318/723 |
| 2007/0188119 A1 | * | 8/2007 | Sonoda et al. ................. 318/254 |
| 2008/0315702 A1 | * | 12/2008 | Ishikawa et al. ............... 310/159 |
| 2011/0193432 A1 | * | 8/2011 | Takechi et al. .................. 310/62 |

FOREIGN PATENT DOCUMENTS

| JP | 2001268869 | 9/2001 |
| JP | 2004274992 | 9/2004 |
| JP | 2004312852 | 11/2004 |
| JP | 2005253184 | 9/2005 |
| JP | 2006-033986 A | 2/2006 |
| JP | 2007068299 | 3/2007 |
| JP | 2010004598 | 7/2010 |

* cited by examiner

Primary Examiner — John K Kim
(74) Attorney, Agent, or Firm — Sughrue Mion, PLLC

(57) ABSTRACT

A dynamoelectric machine main body that includes: a housing that is constituted by a rear bracket and a front bracket; a rotor; a stator; and a fan, and a power supply unit that is mounted integrally onto the dynamoelectric machine main body are included, the power supply unit is disposed between the fan and a bottom portion of the rear bracket, and the power supply unit is disposed between the fan and a bottom portion of the rear bracket, and the rear bracket has: air discharge ports that are formed on portions that are positioned radially outside the fan; and air suction ports that have openings nearer to a bottom portion than the power supply unit, and includes a partitioning member for configuring a ventilation channel that extends from the air suction ports to the air discharge ports that is disposed between the power supply unit and the fan.

9 Claims, 12 Drawing Sheets

POWER SUPPLY UNIT-INTEGRATED DYNAMOELECTRIC MACHINE

BACKGROUND OF THE INVENTION

1. Field of the Invention

The present invention relates to a power supply unit-integrated dynamoelectric machine in which a power supply unit that supplies electric power to an armature winding and a field winding is mounted integrally to a dynamoelectric machine main body that has: a stator that includes the armature winding; a rotor that includes the field winding; and a housing that supports the stator and the rotor.

2. Description of the Related Art

Conventional control apparatus-integrated dynamoelectric machines include: a dynamoelectric machine main body that has: a rotor; load-side and anti-load-side brackets that support the rotor so as to be rotatable around an axis; a stator that is disposed so as to surround the rotor, and that is supported by the load-side and anti-load-side brackets; and fans that are disposed on two axial ends of the rotor, that rotate together with the rotor, and that induce cooling airflows that cool the stator and the rotor; and a control device that is constituted by: a control part that controls the dynamoelectric machine main body; a flat portion onto a front surface of which the control part is mounted; and radiating fins that are disposed so as to project from a rear surface of the flat portion, the control device being fixed to the anti-load-side bracket so as to be disposed such that the radiating fins face a wall portion of the anti-load-side bracket axially outside the rotor so as to leave a predetermined gap between the anti-load-side bracket and the flat portion, such that a cooling airflow passes through the gap in question (see Patent Literature 1, for example).

The gap between the anti-load-side bracket and the flat portion functions as an air suction portion, and a ventilation channel is formed so as extend from the air suction portion, pass through the fins, enter the anti-load-side bracket through penetrating apertures that are formed on the anti-load-side bracket, and reach an air discharge portion that is formed on a portion of the anti-load-side bracket that is positioned outside an outer circumferential portion of the fans.

The cooling airflows that are constantly induced together with rotation of the fans flow through the ventilation channel from the air suction portion toward the air discharge portion, and are discharged outside the housing. Thus, because the heat generated by the control part and conducted to the radiating fins and the heat that is generated by the stator and the rotor is taken by the cooling airflows and discharged outside the housing, the control part, the stator, and the rotor are cooled.

Patent Literature 1: Japanese Patent Laid-Open No. 2006-33986 (Gazette)

In conventional control apparatus-integrated dynamoelectric machines, if the distance between the air discharge portion and the air suction portion is increased, dimensions of the anti-load-side bracket in an axial direction of the rotor increase. In order to achieve reductions in size, conventional control apparatus-integrated dynamoelectric machines have been manufactured so as to reduce the size of the anti-load-side bracket by setting the distance between the air suction portion and the air discharge portion so as to be short.

In such cases, one problem has been that air that takes the heat from the control part, the stator, and the rotor and is warmed and discharged through the air discharge portion may be sucked back into the ventilation channel through the intake portion without being cooled sufficiently, preventing the control part, the stator, and the rotor from being cooled sufficiently.

SUMMARY OF THE INVENTION

The present invention aims to solve the above problems and an object of the present invention is to provide a power supply unit-integrated dynamoelectric machine that enables an air suction port and an air discharge port of a ventilation channel through which air flows for cooling heat from a power circuit module and a field circuit module to be formed on a rear bracket so as to be separated sufficiently without having to increase size of an integrated dynamoelectric machine main body and power supply unit by adopting a configuration in which a heatsink to which the power circuit module and the field circuit module are mounted is disposed inside a housing.

In order to achieve the above object, according to one aspect of the present invention, there is provided a power supply unit-integrated dynamoelectric machine including: a dynamoelectric machine main body that includes: a housing that includes a rear bracket and a front bracket that are each formed so as to have a floored tubular shape, and that are coupled such that opening portions face each other; a rotor that is fixed coaxially to a rotating shaft that has a first end region and a second end region that are rotatably supported by the rear bracket and the front bracket; a stator that is disposed so as to surround the rotor, and that is held between open end portions of the rear bracket and the front bracket; and a fan that is mounted to a first end portion of the rotor; and a power supply unit including: a power circuit module and a field circuit module that supply electric power to the stator and the rotor; and a heatsink to which the power circuit module and the field circuit module are mounted, the power supply unit being mounted integrally onto the dynamoelectric machine main body. The power supply unit is disposed between the fan and a bottom portion of the rear bracket; the rear bracket includes: an air discharge port that is formed on a portion that is positioned radially outside the fan; and an air suction port that has an opening nearer to the floor portion than the power supply unit; and the power supply unit-integrated dynamoelectric machine further includes a partitioning member that is disposed between the power supply unit and the fan so as to allow communication on a radially inner side, and that configures a ventilation channel in which air that is sucked in through the air suction port by negative pressure that is generated on a radially inner side of the fan when the fan rotates is directed to a negative pressure portion of the fan and subsequently sent to the air discharge ports. The heatsink includes: a flat module mount portion to a front surface of which the power circuit module and the field circuit module are mounted; and a first radiating fin that is disposed so as to protrude from a rear surface of the module mount portion, the heatsink being disposed such that the first radiating fin extends inside the ventilation channel.

According to the power supply unit-integrated dynamoelectric machine according to the present invention, a power supply unit is disposed inside a rear bracket, air suction ports are disposed on portions of the rear bracket that are nearer to the bottom portion than the power supply unit, and air discharge ports are disposed on portions of the rear bracket that are nearer to a rotor than the power supply unit. Because of this, distance between the air suction ports and the air discharge ports can be lengthened without increasing the size of the power supply unit-integrated dynamoelectric machine. Thus, air that has been discharged through the air discharge ports is prevented from flowing around into the air suction ports and being sucked into the ventilation channel again, enabling the power circuit module, the field circuit module, the stator, and the rotor to be cooled effectively.

DETAILED DESCRIPTION OF THE PREFERRED EMBODIMENTS

Preferred embodiments of the present invention will now be explained with reference to the drawings.
Embodiment 1

Figure 1:
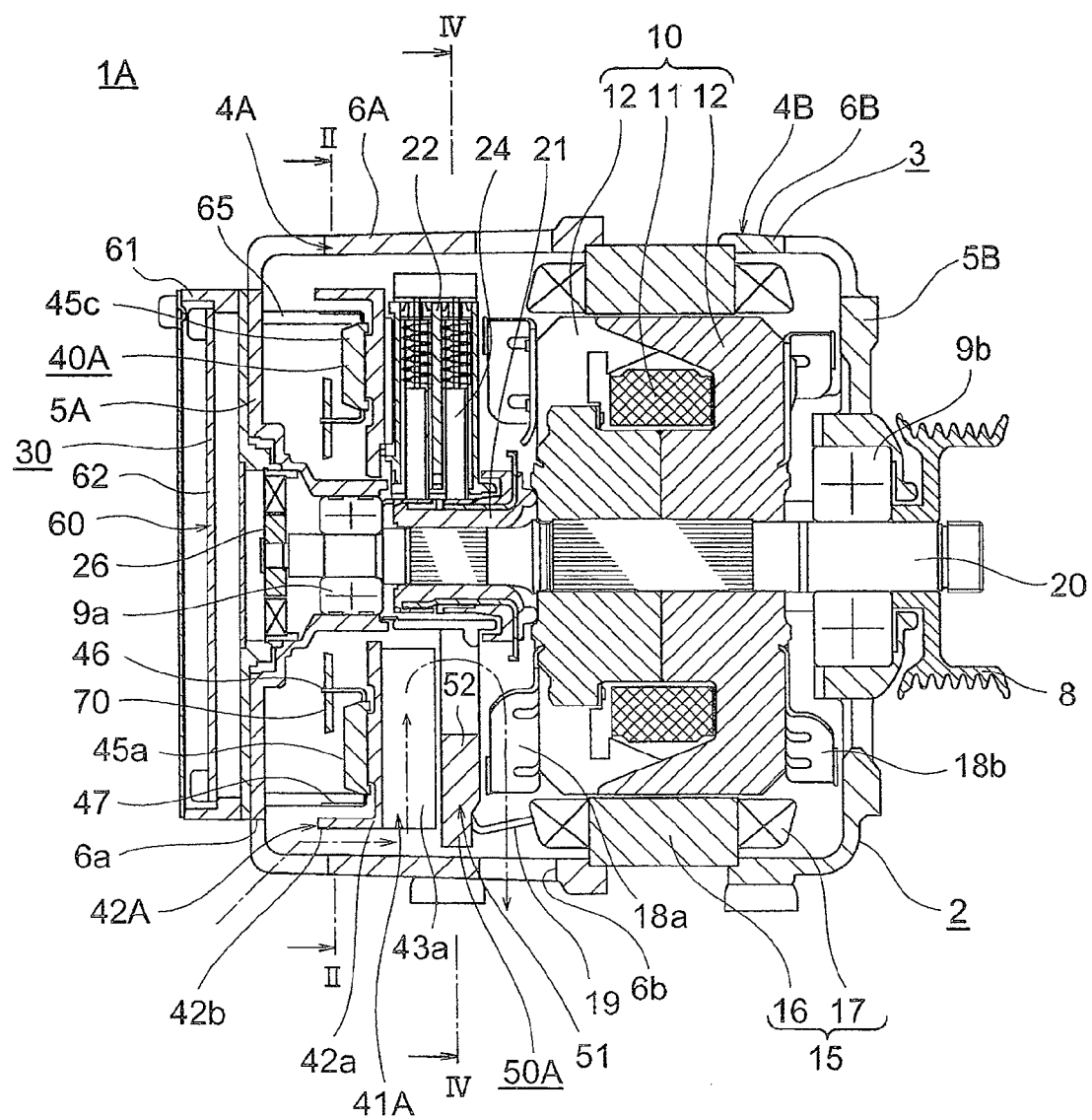
FIG. 1 is a cross section of a power supply unit-integrated dynamoelectric machine according to Embodiment 1 of the present invention.
Figure 2:
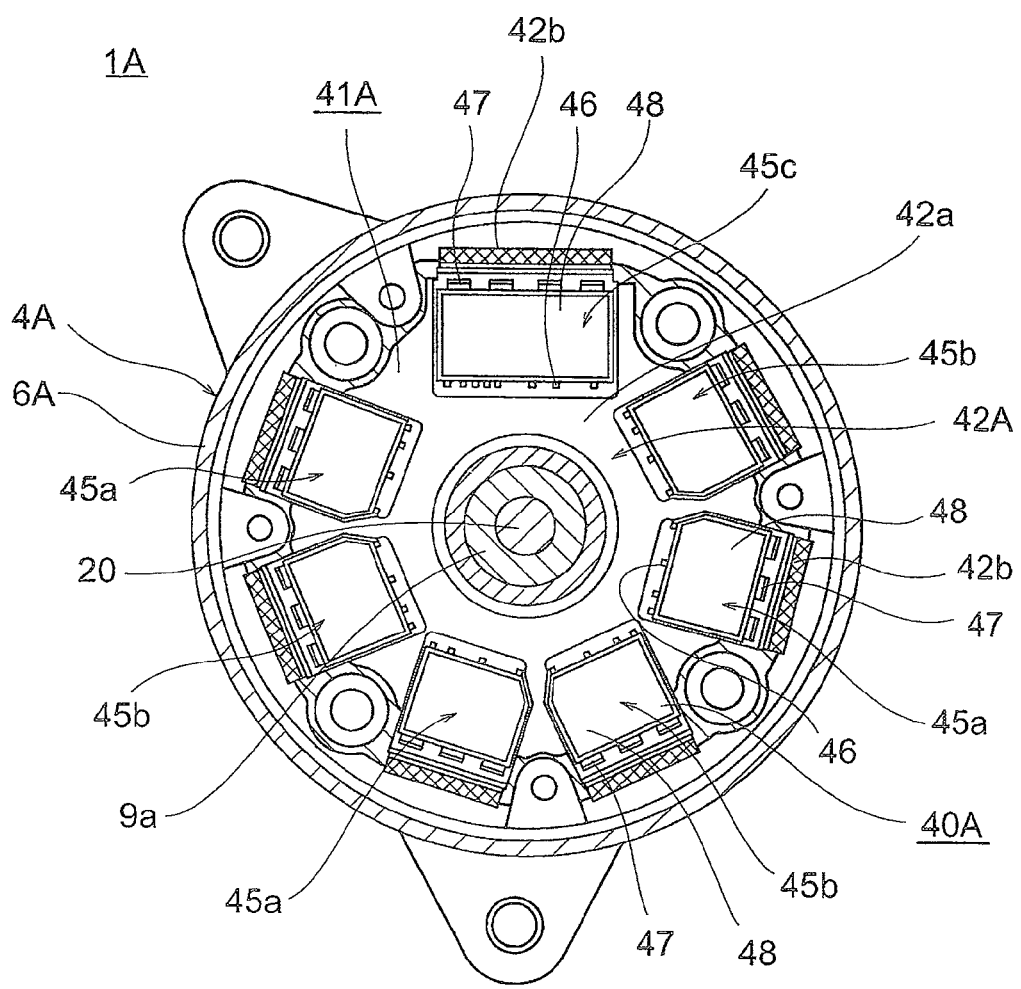
FIG. 2 is a cross section that is taken along Line II-II in FIG. 1 so as to be viewed from the direction of the arrows.
Figure 3:
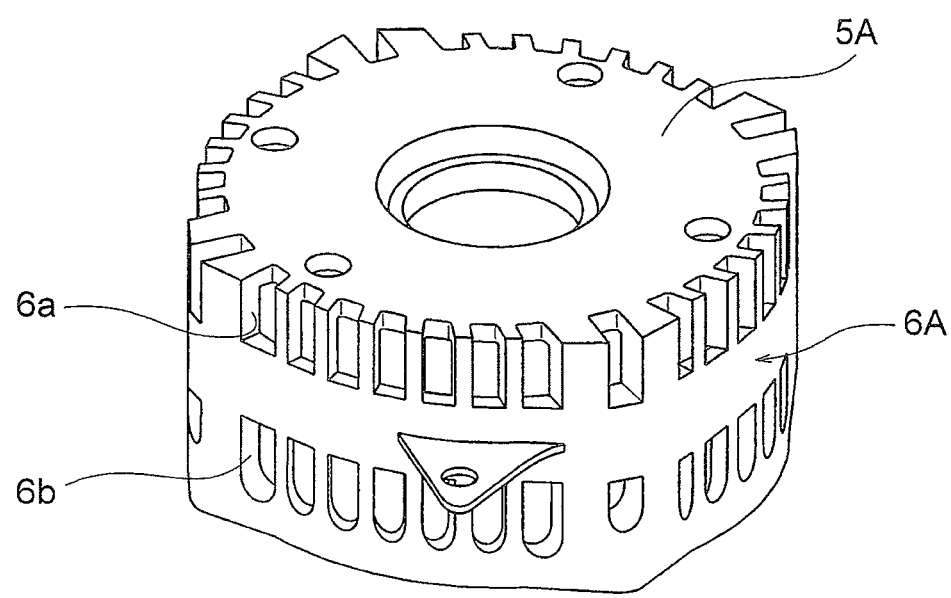
FIG. 3 is a perspective of a rear bracket of the power supply unit-integrated dynamoelectric machine according to Embodiment 1 of the present invention.
Figure 4:
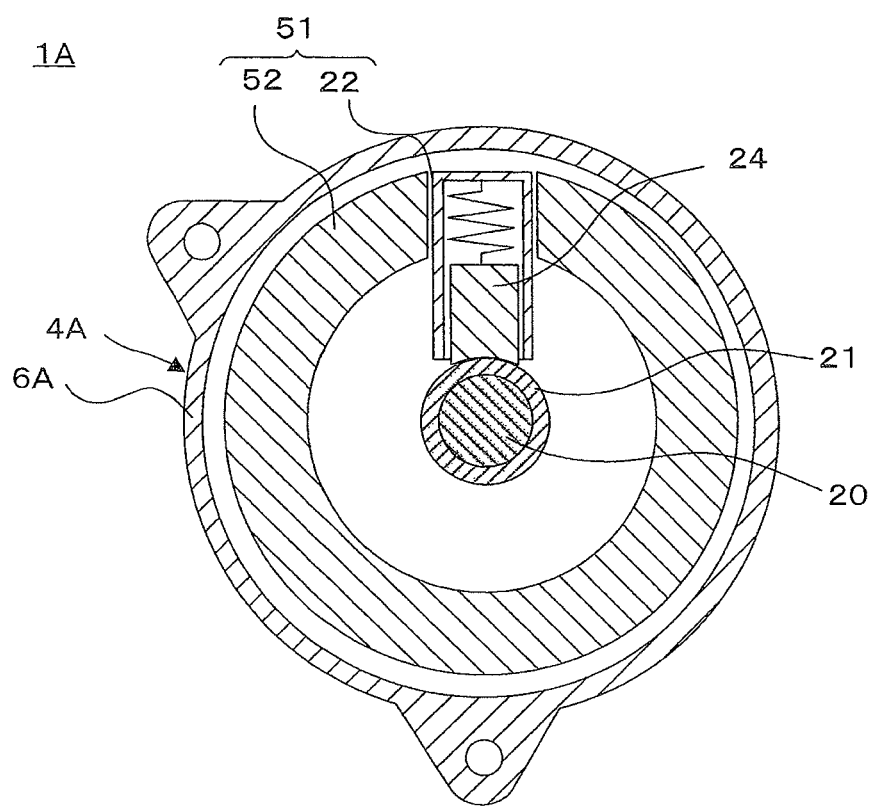
FIG. 4 is a cross section that is taken along Line IV-IV in FIG. 1 so as to be viewed from the direction of the arrows.

FIG. 1 is a cross section of a power supply unit-integrated dynamoelectric machine according to Embodiment 1 of the present invention, FIG. 2 is a cross section that is taken along Line II-II in FIG. 1 so as to be viewed from the direction of the arrows, FIG. 3 is a perspective of a rear bracket of the power supply unit-integrated dynamoelectric machine according to Embodiment 1 of the present invention, and FIG. 4 is a cross section that is taken along Line IV-IV in FIG. 1 so as to be viewed from the direction of the arrows.

In FIGS. 1 through 4, a power supply unit-integrated dynamoelectric machine 1A has: a dynamoelectric machine main body 2; and a control apparatus 30 that is mounted integrally onto the dynamoelectric machine main body 2.

The dynamoelectric machine main body 2 includes: a housing 3 that is constituted by a rear bracket 4A and a front bracket 4B that are integrated using bolts (not shown); a rotating shaft 20 that is supported so as to be rotatable around an axis by a pair of bearings 9a and 9b that are mounted to the rear bracket 4A and a front bracket 4B; a rotor 10 that is fixed coaxially to the rotating shaft 20 inside the housing 3 and that rotates together with the rotating shaft 20; a stator 15 that is fixed to the housing 3 so as to surround an outer circumferential side of the rotor 10; a resolver 26 that is mounted to a first end of the rotating shaft 20, and that detects rotation angle of the rotor 10; and a pulley 8 that is fixed to a second end of the rotating shaft 20.

The dynamoelectric machine main body 2 includes: fans 18a and 18b that are mounted to first and second axial end portions of the rotor 10 so as to be coaxial with the rotor 10; slip rings 21 that are fixed to the rotating shaft 20 at the first axial end of the rotor 10, and that supply electric current to the rotor 10; and a pair of brushes 24 that are housed so as to slide in contact with the slip rings 21 in a brush holder 22 that is supported by the rear bracket 4A.

As shown in FIG. 3, the rear bracket 4A is prepared so as to have a floored, approximately tubular shape that is constituted by a bottom portion 5A and a tubular portion 6A, and a shaft insertion aperture is formed so as to have an opening at a central portion of the bottom portion 5A.

A plurality of air suction ports 6a are formed near a first axial end of the tubular portion 6A at an approximately uniform angular pitch circumferentially, and air discharge ports 6b are formed near a second axial end of the tubular portion 6A at a pitch equal to that of the air suction ports 6a circumferentially.

The air suction ports 6a and the air discharge ports 6b are formed so as to have slot shapes that have a longitudinal direction that is oriented in an axial direction of the tubular portion 6A. First longitudinal ends of the air suction ports 6a are formed so as to extend from the tubular portion 6A to portions that include an outer edge of the bottom portion 5A.

The front bracket 4B is prepared so as to have a floored, approximately tubular shape that is constituted by a bottom portion 5B and a tubular portion 6B, and a shaft insertion aperture is formed so as to have an opening at a central portion of the bottom portion 5B.

The rear bracket 4A and the front bracket 4B are disposed such that opening portions of each face each other, and are coupled using bolts (not shown) to constitute the housing 3.

A first end and a second end of the rotating shaft 20 are rotatably supported by the pair of bearings 9a and 9b that are mounted to the shaft insertion apertures, which are respectively formed on the bottom portions 5A and 5B.

The rotor 10 is constituted by: a field winding 11 that generates magnetic flux on passage of electric current; and a pair of pole core bodies 12 that are disposed so as to cover the field winding 11, and in which magnetic poles form due to the magnetic flux that is generated by the field winding 11. The pair of pole core bodies are made of iron, respectively have eight, for example, claw-shaped magnetic poles disposed so as to project axially at a uniform angular pitch circumferentially on outer circumferential edges thereof, and are fixed to the shaft 20 so as to face each other so as to intermesh the claw-shaped magnetic poles.

The stator 15 includes: a stator core 16; and an armature winding 17 that is mounted to the stator core 16. Moreover, the armature winding 17 is constituted by two three-phase alternating current windings (not shown) that are each star-connected.

The stator 15 is disposed so as to surround the rotor 10, and is held between open end portions of the rear bracket 4A and the front bracket 4B. Here, the air discharge ports 6b that are formed on the rear bracket 4A are positioned radially outside the fan 18a.

The brush holder 22 is formed so as to have a box shape in which a first surface has an opening portion, and that has a predetermined depth between the opening portion and a bottom portion that faces the opening portion. The pair of brushes 24 are housed in the brush holder 22 so as to be parallel to each other so as to extend in a depth direction such that a portion of each projects out through the opening. Moreover, the brush holder 22 has a predetermined width in a direction of arrangement of the brushes 24. Although not shown in detail, a through aperture for allowing passage of air in the direction of arrangement of the pair of brushes 24 is also formed on the brush holder 22.

The brush holder 22 is disposed such that the opening portion faces the slip rings 21, and a width direction is oriented in an axial direction of the rotating shaft 20. End portions of the brushes 24 that project outward from the opening portion of the brush holder 22 contact the slip rings 21.

The dynamoelectric machine main body 2 is configured in the above manner.

The control apparatus 30 is constituted by a power supply unit 40A, a ventilation channel forming means 50A, and a control unit 60.

The power supply unit 40A includes: a heatsink 41A that is constituted by: a base plate 42A; and first radiating fins 43a that project outward from the base plate 42A, the heatsink 41A being disposed inside the housing 3 so as to be supported by the rear bracket 4A; three pairs of first and second power circuit modules 45a and 45b that are mounted to the base plate 42A, and that have switching elements (not shown) that switch electric current that is supplied to the stator 150N and OFF; and a field circuit module 45c that is mounted to the base plate 42A, and that has a switching element that switches electric current that is supplied to the rotor 100N and OFF.

The heatsink 41A is prepared by aluminum die casting. The base plate 42A has: a module mount portion 42a that forms a disk shape through which a penetrating aperture is passed centrally, and that has a mounting surface on a front surface to which the first and second power circuit modules 45a and 45b and the field circuit module 45c are mounted; and first guide portions 42b that are disposed so as to protrude from edge portions radially outside portions to which the first and second power circuit modules 45a and 45b and the field circuit module 45c are mounted.

A plurality of first radiating fins 43a project outward at a uniform angular pitch over an entire circumferential region of the module mount portion 42a. Moreover, a length of projection of the first radiating fins 43a that project outward from a rear side of a portion of the module mount portion 42a to which the field circuit module 25c is mounted is shorter than a length of the first radiating fins 43a that project outward from the rear surface of other portions of the module mount portion 42a.

Here, spacing between the first radiating fins 43a that are positioned at two ends in the direction of arrangement among the plurality of first radiating fins 43a that have a short length of projection corresponds approximately to the width of the brush holder 22.

The first and second power circuit modules 45a and 45b include: a plurality of first lead terminals 46 which are used for inputting control signals for the switching elements; a plurality of second lead terminals 47 which are used for electric power transmission to the armature winding 17 of the stator 15; and sealing bodies 48 that seal the switching elements. Moreover, the first and second power circuit modules 45a and 45b are configured as molded seal modules that are prepared so as to integrate the first lead terminals 46 and the second lead terminals 47 by molding.

The sealing bodies 48 are configured by hardening the resin that was used in molding, and although not shown in detail, heat-radiating current-carrying portions that are connected to the second lead terminals 47 (not shown) are exposed on rear surfaces of the sealing bodies 48. The sealing bodies 48 have side surfaces that face each other from which the first lead terminals 46 and the second lead terminals 47 respectively project outward, the first lead terminals 46 projecting outward from a first side surface, and the second lead terminals 47 projecting outward from a second side surface.

The first and second power circuit modules 45a and 45b are prepared so as to have mirror symmetrical constructions.

Specifically, the first and second power circuit modules 45a and 45b are configured such that the sealing bodies 48 have mirror symmetry on two sides of an intermediate portion in the direction of arrangement of the first and second power circuit modules 45a and 45b when placed on heat sink conducting portions in a common plane and lined up such that side surfaces of the sealing bodies 48 from which the first lead terminals 46 project are positioned in the direction of arrangement of the first lead terminals 46.

The field circuit module 45c has a configuration that is similar to that of the first and second power circuit modules 45a and 45b. However, the second lead terminal 47 of the field circuit module 45c is used for electric power transmission to the field winding 11 of the rotor 10.

The ventilation channel forming means 50A is constituted by: a partitioning member 51 that forms a partition between the power supply unit 40A and the fan 18a; and first guide portions 42b.

A partitioning member 51 is constituted by: a partitioning plate 52; and the brush holder 22 to which the brushes 24 have been mounted.

The partitioning plate 52 is prepared so as to have a C-shaped flat plate shape as shown in FIG. 4, and a width of a space that is formed between two end portions of the C shape corresponds to the width of the brush holder 22.

The control unit 60 includes: an external case 61 that is fixed to an external portion of the rear bracket 4A; and a control circuit board 62 that is mounted inside the external case 61, and that has a control circuit portion (not shown) that outputs control signals for the switching elements of the first and second power circuit modules 45a and 45b and the field circuit module 45c.

Next, a construction for mounting the control device 30 to the dynamoelectric machine main body 2 will be explained.

The field circuit module 45c is mounted to a surface of the module mount portion 42a that corresponds to the first radiating fins 43a that have a short length. The power supply unit 40A is configured by further mounting the first and second power circuit modules 45a and 45b to remaining surfaces of the module mount portion 42a such that the first power circuit modules 45a and the second power circuit modules 45b are alternately arranged in a circumferential direction of the module mount portion 42a.

Here, the field circuit module 45c and the first and second power circuit modules 45a and 45b are mounted to the front surface of the module mount portion 42a such that the second lead terminals 47 are oriented radially outside the module mount portion 42a, and rear surfaces face the surface of the module mount portion 42a, and so as to maintain electrical insulation from the heatsink 41A.

The power supply unit 40A is disposed between the fan 18a and the bottom portion 5A of the rear bracket 4A. Here, the power supply unit 40A is disposed by coaxially inserting the rotating shaft 20 through the penetrating aperture that is formed on the module mount portion 42a such that leading ends of the first radiating fins 43a of the heatsink 41A are oriented toward the fan 18a, and the module mount portion 42a is perpendicular to the rotating shaft 20.

Here, the heatsink 41A is disposed such that the brush holder 22 is housed near the leading ends of the first radiating fins 43a that have a short length of projection.

The power supply unit 40A is fixed to the rear bracket 4A by means of bolts 65 by inserting the bolts 65 through the module mount portion 42a from a side near the first radiating fins 43a of the heatsink 41A and screwing them into the bottom portion 5A of the rear bracket 4A. Thus, the heatsink 41A and the housing 3 have identical electric potential.

Because the power supply unit 40A is disposed between the bottom portion 5A and the fan 18a in this manner, opening portions of the air suction ports 6a that are formed on the first axial end of the tubular portion 6A are positioned nearer to the bottom portion 5A than the power supply unit 40A. Because the air discharge ports 6b are positioned radially outside the fan 18a, they are positioned nearer to the rotor 10 than the power supply unit 40A.

The partitioning plate 52 is disposed inside the rear bracket 4A such that front and rear surfaces are perpendicular to an axial direction of the rotating shaft 20 (direction of rotational axis of the rotor 10) so as to form a partition between a portion on an outer circumferential side of the fan 18a and leading ends of the first radiating fins 43a that face the portion in question. Here, as shown in FIG. 4, the partitioning plate 52 is disposed so as to surround the rotating shaft 20, and its position around an axis of the rotating shaft 20 is adjusted such that the brush holder 22 is disposed between a first end and a second end of the C shape. As shown in FIG. 1, an outer circumferential portion of the partitioning plate 52 faces portions of the rear bracket 4A that are adjacent to the air discharge ports 6b near the air suction ports 6a practically without leaving gaps.

To summarize the above, the partitioning member 51 is disposed inside the rear bracket 4A between the power supply unit 40A and the fan 18a such that the power supply unit 40A and a radially inner side of the fan 18a communicate.

As has been mentioned above, a through aperture for allowing passage of air in the direction of arrangement of the pair of brushes 24 that are housed inside is formed near one end of the brush holder 22.

As indicated by dotted chain lines with arrows in FIG. 1, a first ventilation channel that extends from the air suction ports 6a to the air discharge ports 6b is configured inside the rear bracket 4A by the base plate 42A, the ventilation channel forming means 50A, the rotor 10, and the stator 15.

The first ventilation channel is configured so as to pass from the air suction ports 6a through an outer circumferential portion of the module mount portion 42a, pass between the rear surface of the module mount portion 42a and the partitioning member 51, progress radially inward relative to the partitioning member 51 and pass through a radially inner side of the fan 18a, and further pass between the rotor 10 and the partitioning member 51 and between the stator 15 and the partitioning member 51 to reach the air discharge ports 6b. Here, a direction of extension of the first ventilation channel is inverted in a vicinity of the radially inner side of the fan 18a.

Because the first ventilation channel is configured in this manner, the heatsink 41A is disposed such that the first radiating fins 43a extend inside the first ventilation channel.

The external case 61 of the control unit 60 is fixed to an outer wall of the bottom portion 5A of the rear bracket 4A.

In addition, a relay circuit board 70 is mounted to the first lead terminals 46 of the first and second power circuit modules 45a and 45b and the field circuit module 45c, and the control circuit board 62 and the relay circuit board 70 are coupled by means of connectors (not shown). The relay circuit board 70 has a wiring pattern that connects portions to which the first lead terminals 46 are coupled and portions to which the connectors are coupled.

The control circuit portion of the control circuit board 62 can thereby output control signals to the first lead terminals 46 of the first and second power circuit modules 45a and 45b and the field circuit module 45c.

Although not shown in detail, each of the output wires 19 of the respective three-phase alternating-current windings that constitute the armature winding 17 is coupled to a respective relay terminal that is disposed on the partitioning plate 52. The output wires 19 are electrically connected to the second lead terminals 47 by means of wiring members that link the second lead terminals 47 of the first and second power circuit modules 45a and 45b and the relay terminals. The brushes 24 and the second lead terminals 47 of the field circuit module 45c are also electrically connected by wiring members. Thus, it is possible to supply electric power from the second lead terminals 47 of each of the first and second power circuit modules 45a and 45b and the field circuit module 45c to the armature winding 17 and the field winding 11, respectively.

The power supply unit-integrated dynamoelectric machine 1A is configured by integrating the dynamoelectric machine main body 2 and the control device 30 in the above manner.

Next, a system configuration for the power supply unit-integrated dynamoelectric machine 1A will be explained.

In the power supply unit-integrated dynamoelectric machine 1A, although not shown in detail, sets of three power circuit modules among a total of six first and second power circuit modules 45a and 45b constitute inverter units. The control circuit portion of the control circuit board 62 is connected so as to enable control of ON/OFF switching of the switching elements of the first and second power circuit modules 45a and 45b and the field circuit module 45c.

A battery, the three-phase alternating-current windings that constitute the armature winding 17, and the inverter units are connected so as to enable control of the power supply to each of the phase windings of the three-phase alternating-current windings to be performed by ON/OFF control of the switching elements of the power circuit modules that constitute the inverter units.

The battery, the field winding 11, and the field circuit module 45c are connected so as to enable control of the power supply to the field winding 11 to be performed by ON/OFF control of the switching elements of the field circuit module 45c.

Operation of the power supply unit-integrated dynamoelectric machine 1A will be explained.

The power supply unit-integrated dynamoelectric machine 1A functions as both an electric motor and a generator, and can be used in idling-reduced vehicles, etc., in which stopping and starting of an engine are performed frequently, for example.

First, operation as an electric motor will be explained. Although not shown in detail, when starting an engine, direct-current power is supplied to the inverter units from the battery. The control circuit portion that is mounted to the control circuit board 62 controls ON/OFF switching of the switching elements 52 of the first and second power circuit modules 45a and 45b that constitute each of the inverter units such that the direct current that has been input from the battery to the inverter units is converted to three-phase alternating-current and is supplied to the three-phase alternating-current windings.

Rotating magnetic fields are generated around the field winding 11 to which electric current that corresponds to the control signal that is input from the control circuit board 62 is being supplied, rotating the rotor 10. Torque from the rotor 10 is transmitted to the engine from the pulley 8 (see FIG. 1) by means of a belt (not shown) to start the engine.

Here, when the rotor 10 is rotated, the fans 18a and 18b rotate, and near one fan 18a, air flows radially outward from radially inside the fan 18a and is discharged through the air discharge ports 6b, forming negative pressure radially inside the fan 18a.

Air outside the rear bracket 4A is thereby sucked in through the air suction ports 6a, and the air that has been sucked in passes through the outer circumferential portion of the module mount portion 42a, flows radially inward between the rear surface of the module mount portion 42a and the partitioning member 51, and is led to the negative pressure portion of the fan 18a.

Here, the first guide portions 42b guide the air that has been sucked in through the air suction ports 6a between the rear surface of the module mount portion 42a and the partitioning member 51.

The air that has been admitted to the negative pressure portion of the fan 18a then passes between the partitioning member 51 and the rotor 10, is conveyed to the air discharge ports 6b, and is discharged outside the rear bracket 4A.

Because heat that has been generated by the first and second power circuit modules 45a and 45b and the field circuit module 45c and transferred to the first radiating fins 43a and heat that is generated by the stator 15 and the rotor 10 is taken by the air that moves through the first ventilation channel, and is discharged outside the housing 3 through the air discharge ports 6b, the first and second power circuit modules 45a and 45b, the field circuit module 45c, the stator 15, and the rotor 10 are cooled.

Next, operation as a generator will be explained.

Once the engine has been started, torque from the engine is transmitted to the rotating shaft 20 by means of a crank shaft (not shown), the belt, and the pulley 8. The rotor 10 is thereby rotated, inducing a three-phase alternating-current voltage in the three-phase alternating-current windings of the armature winding 17. Then, the control circuit that is mounted to the circuit board 62 controls ON/OFF switching of the switching elements 52 of the inverter units 100 so as to convert the three-phase alternating-current power that is induced in the three-phase alternating-current windings into direct-current power, and the battery is charged by this direct-current power.

When the rotor 10 is rotated, the first and second power circuit modules 45a and 45b, the field circuit module 45c, the stator 15, and the rotor 10 are cooled in a similar manner to the explanation of operation as an electric motor.

In a power supply unit-integrated dynamoelectric machine 1A according to Embodiment 1, a power supply unit 40A is disposed between a fan 18a and a bottom portion 5A of a rear bracket 4A. On the rear bracket 4A, air discharge ports 6b are formed on portions nearer to the rotor 10 than the power supply unit 40A, and air suction ports 6a are formed so as to have openings nearer to the bottom portion 5A than the power supply unit 40A. A partitioning member 51 that surrounds the rotating shaft 20 is disposed between the power supply unit 40A and the fan 18a such that the power supply unit 40A and a radially inner side of the fan 18a communicate. A first ventilation channel in which air sucked in through the air suction ports 6a by negative pressure generated radially inside the fan 18a when the fan 18a rotates is sent to the air discharge ports 6b after being directed to the negative pressure portion of the fan 18a is configured inside the rear bracket 4A together with the base plate 42A and the rotor 10 and the stator 15 by disposing the partitioning member 51.

A heatsink 41A has: a flat module mount portion 42a to a surface of which are mounted first and second power circuit modules 45a and 45b and a field circuit module 45c; and first radiating fins 43a that are disposed so as to protrude from a rear surface of the module mount portion 42a, and is disposed such that first radiating fins 43a extend inside the ventilation channel.

Because the power supply unit 40A is disposed inside the rear bracket 4A, and the air suction ports 6a and the air discharge ports 6b are disposed on a side near the bottom portion 5A of the rear bracket 4A and a side near the rotor 10 in the above manner, distance between the air suction ports 6a and the air discharge ports 6b can be lengthened without increasing the size of the power supply unit-integrated dynamoelectric machine 1A compared with conventional control apparatus-integrated dynamoelectric machines, which had air suction portions at positions that corresponded to the radiating fins of the heatsink relative to an axial direction of the rotating shaft 20.

Thus, at the air discharge ports 6b, air that has been discharged through the air discharge ports 6b is less likely to be influenced by suction of air at the air suction ports 6a, and is prevented from flowing around into the air suction ports 6a, and being sucked into the first ventilation channel again. Even if the air that has been discharged through the air discharge ports 6b does happen to flow around into the air suction ports 6a, it will be cooled while flowing around into the air suction ports 6a before flowing into the first ventilation channel. Consequently, the first and second power circuit modules 45a and 45b, the field circuit module 45c, the stator 15, and the rotor 10 can be cooled effectively.

The first and second power circuit modules 45a and 45b and the field circuit module 45c are mounted to the heatsink 41A so as to be electrically insulated, and the heatsink 41A and the housing 3 are connected so as to have identical electric potential.

In a power supply unit-integrated dynamoelectric machine 1A that is mounted to an automobile, the housing 3 is usually grounded. If the heatsink 41A and the housing 3 were not set to identical electric potential, the problems described below would arise.

Specifically, if mechanical shock acts on the automobile, and the rear bracket 4A is deformed by a certain amount and contacts the heatsink 41A, the heatsink 41A and the rear bracket 4A will short-circuit, and a large electric current will flow. In order to cope with this problem, countermeasures may be taken to widen the gap between the heatsink 41A and the rear bracket 4A to ensure that the heatsink 41A does not make contact even if the rear bracket 4A is deformed. In that case, because the heatsink 41A is reduced in size, the heat radiating area of the first radiating fins 43a is reduced.

If, on the other hand, the first and second power circuit modules 45a and 45b and the field circuit module 45c are electrically insulated from the heatsink 41A, and the heatsink 41A and the housing 3 are set to identical electric potential in advance, it is no longer necessary to widen the gap between the heatsink 41A and the rear bracket 4A to allow for contact between the heatsink 41A and the rear bracket 4A.

Because the heat radiating area of the first radiating fins 43a can be enlarged thereby, the heat radiating performance of the heatsink 41A is improved.

Moreover, in Embodiment 1, the first guide portions 42b are explained as being prepared integrally on the module mount portion 42a so as to constitute part of the base plate 42A of the heatsink 41A, but first guide portions may also be constituted by a separate member from the heatsink.

In addition, it is not absolutely necessary to dispose the first guide portions 42b, and they may also be omitted. However, because a function of guiding the air that has been sucked in through the air suction ports 6a to the rear surface side of the module mount portion 42a smoothly is served by disposing the first guide portions 42b, turbulence in the air that flows through the first ventilation channel when the fan 18a rotates can be suppressed.

The first radiating fins 43a are explained as projecting outward from the entire region of the rear surface of the module mount portion 42a, but it is not necessary for the first radiating fins 43a to project from the entire region of the rear surface of the module mount portion 42a provided that the first radiating fins 43a are disposed so as to project from portions of the rear surface of the module mount portion 42a that are positioned behind the first and second power circuit modules 45a and 45b and the field circuit module 45c.

The air discharge ports 6b are explained as being formed on the rear bracket 4A so as to have openings at positions that are at a distance from the opening end of the tubular portion 6A, but air discharge ports may also be formed by notches that have openings on end portions near the opening of the tubular portion 6A.

If the rear bracket 4A on which the air discharge ports 6b are formed is to be prepared by die casting, it is necessary to prepare a mold that can be slid in an axial direction of the tubular portion 6A of the rear bracket 4A, and molds for air discharge port formation that can be slid in a radial direction of the tubular portion 6A of the rear bracket 4A.

In contrast to that, if the air discharge ports are formed by notches that have openings on end portions near the opening of the tubular portion, the rear bracket can be prepared at reduced cost because the rear bracket can be prepared using only a mold that can be slid in the axial direction of the tubular portion of the rear bracket.

Embodiment 2

Figure 5:
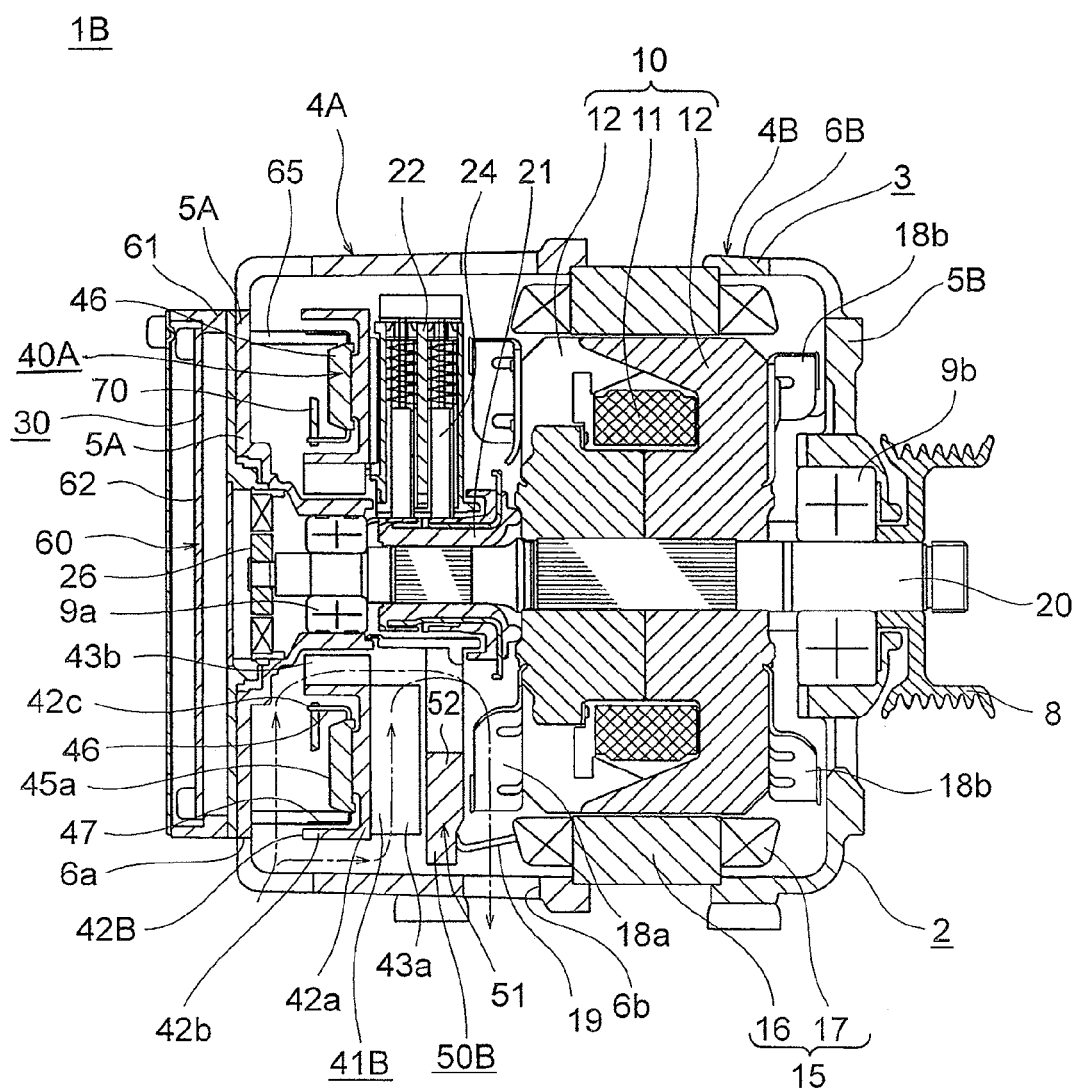
FIG. 5 is a cross section of a power supply unit-integrated dynamoelectric machine according to Embodiment 2 of the present invention.

FIG. 5 is a cross section of a power supply unit-integrated dynamoelectric machine according to Embodiment 2 of the present invention.

Moreover, in FIG. 5, portions identical to or corresponding to those in Embodiment 1 will be given identical numbering, and explanation thereof will be omitted.

In FIG. 5, a power supply unit-integrated dynamoelectric machine 1B is configured in a similar manner to that of the power supply unit-integrated dynamoelectric machine 1A except that a heatsink 41B is used instead of the heatsink 41A.

A base plate 42B of the heatsink 41B has a tubular second guide portion 42c that is disposed on a front surface side of a module mount portion 42a so as to project from an entire region of an edge portion of a penetrating aperture that is formed at a central portion of the module mount portion 42a. Second radiating fins 43b are disposed so as to project from an inner surface of the second guide portion 42c so as to be arranged in an approximately circumferential direction of the second guide portion 42c. Here, radiating surfaces of the second radiating fins 43b are parallel to a direction that is perpendicular to the module mount portion 42a. The rest of the configuration of the heatsink 41B is similar to that of the heatsink 41A. A ventilation channel forming means 50B is configured by a partitioning member 51, first guide portions 42b, and the second guide portion 42c.

The heatsink 41B is supported inside the rear bracket 4A such that a configurative relationship between the module mount portion 42a and the rear bracket 4A is similar to the configurative relationship between the module mount portion 42a of the heatsink 41A and the rear bracket 4A. The second guide portion 42c thereby extends from an inner circumferential portion of the module mount portion 42a toward the bottom portion 5A.

In a power supply unit-integrated dynamoelectric machine 1B that has been configured in the above manner, as indicated by dotted chain lines with arrows in FIG. 5, a second ventilation channel is formed so as to have a pathway that passes through a space between the front surface of the module mount portion 42a of the base plate 42B and the bottom portion 5A of the rear bracket 4A, and a space between the second guide portion 42c and a portion of the rear bracket 4A that forms the shaft insertion aperture and merges with the first ventilation channel.

In other words, the second ventilation channel is configured such that air that is sucked in through the air suction ports 6a when the fan 18a rotates flows radially inward over the front surface side of the module mount portion 42a, passes from the front surface side of the module mount portion 42a through the inner circumferential portion of the module mount portion 42a, heads toward the rotor 10 and merges with the first ventilation channel.

The second radiating fins 43b that are disposed so as to protrude from the second guide portion 42c are disposed so as to extend into the second ventilation channel.

In a power supply unit-integrated dynamoelectric machine 1B that has been configured in the above manner, when the fan 18a and 18b are rotated, air flows outward from inside the fan 18a, and is discharged through the air discharge ports 6b. Thus, because negative pressure forms near a central portion of the fan 18a, air is sucked in through the air suction ports 6a. The air that has been sucked in is divided into a portion that flows through the first ventilation channel and is discharged through the air discharge ports 6b, and a portion that flows through the second ventilation channel, and then merges with the first ventilation channel immediately before the negative pressure portion of the fan 18a and is discharged through the air discharge ports 6b. Here, the second guide portion 42c serves a function of guiding to the rear surface side of the module mount portion 42a air that has been led from the air suction ports 6a through a front surface side of the module mount portion 42a to the inner circumferential portion.

According to the power supply unit-integrated dynamoelectric machine 1B according to Embodiment 2, in addition to a first ventilation channel, a second ventilation channel is formed such that air flows radially inside the tubular portion 6A so as to flow over the front surface side of the module mount portion 42a from the air suction ports 6a, pass from the front surface side of the module mount portion 42a through the inner circumferential portion of the module mount portion 42a and flow toward the rotor 10 and merge with the first ventilation channel.

A second guide portion 42c is disposed so as to extend toward the bottom portion 5A from an inner circumferential portion of the module mount portion 42a, and second radiating fins 43b are disposed so as to project from the second guide portion 42c so as to extend into the second ventilation channel.

By disposing the second radiating fins 43b in the second ventilation channel, in addition to the first radiating fins 43a, heat radiating area for radiating the heat from the first and second power circuit modules 45a and 45b and the field circuit module 45c is increased. Consequently, in addition to the effects of Embodiment 1, effects such as enabling the first and second power circuit modules 45a and 45b and the field circuit module 45c to be effectively cooled can be achieved.

Now, as has been mentioned above, the direction of extension of the first ventilation channel is inverted from radially in toward the fan 18a to radially out from the fan 18a in a vicinity of passing through the negative pressure portion of the fan 18a. Because of this, if, hypothetically, there were no second ventilation channel, air that flows through the first ventilation channel would tend to accumulate in the vicinity of the negative pressure portion of the fan 18a when the fan 18a rotates.

However, the second ventilation channel is disposed so as to merge with the first ventilation channel immediately before reaching the negative pressure portion of the fan 18a, and the air inside the second ventilation channel at the merging portion with the first ventilation channel flows from an end that faces the negative pressure portion of the fan 18a toward the rotor 10 (the fan 18a).

Because of this, air that has flowed through the second ventilation channel to the merging portion with the first ventilation channel directs air that has flowed through the first ventilation channel until immediately before the negative pressure portion of the fan 18a smoothly to the negative pressure portion of the fan 18a. Air accumulating immediately before the fan 18a is thereby suppressed. Consequently, because the air that has been sucked in through the air suction ports 6a flows without accumulating inside the first ventilation channel and the second ventilation channel, the first and second power circuit modules 45a and 45b, the field circuit module 45c, the stator 15, and the rotor 10 can be cooled even more effectively.

Moreover, by making the airflow rate inside the second ventilation channel immediately before merging with the first ventilation channel greater than the airflow rate inside the first ventilation channel, air likely to accumulate in the first ventilation channel immediately before the fan 18a can be even more effectively directed to the fan 18a. The airflow rates inside the first ventilation channel and the second ventilation channel can be arbitrarily set to different airflow rates by setting differences between an array pitch of the first radiating fins 43a and an array pitch of the second radiating fins 43b, etc., or setting differences between the projecting lengths of the first radiating fins 43a and the second radiating fins 43b from the base plate 42B, etc. Specifically, the array pitch of the second radiating fins 43b can be set wider than the array pitch of the first radiating fins 43a, for example, to make the pressure loss in the air that flows between the second radiating fins less than the pressure loss in the air that flows between the first radiating fins 43b.

By facilitating transfer to the second radiating fins 43b of heat that is generated by the first and second power circuit modules 45a and 45b and the field circuit module 45c, heat radiation by the second radiating fins 43b can be utilized effectively. In this case, the thickness of the second guide portion 42c, for example, should be increased as much as possible.

Moreover, in Embodiment 2, the second guide portions 42c are explained as being prepared integrally on the module mount portion 42a so as to constitute part of the base plate 42B of the heatsink 41B, but second guide portions may also be constituted by a separate member from the heatsink.

In addition, it is not absolutely necessary to dispose the second guide portions 42c and the second radiating fins 43b, and they may also be omitted.

However, because the flow of air that passes from the front surface side of the module mount portion 42a through the inner circumferential portion of the module mount portion 42a and heads toward the rotor 10 is stabilized by disposing the second guide portion 42c, accumulation preventing effects on the air immediately before the negative pressure portion of the fan 18a can be increased.

Embodiment 3

Figure 6:
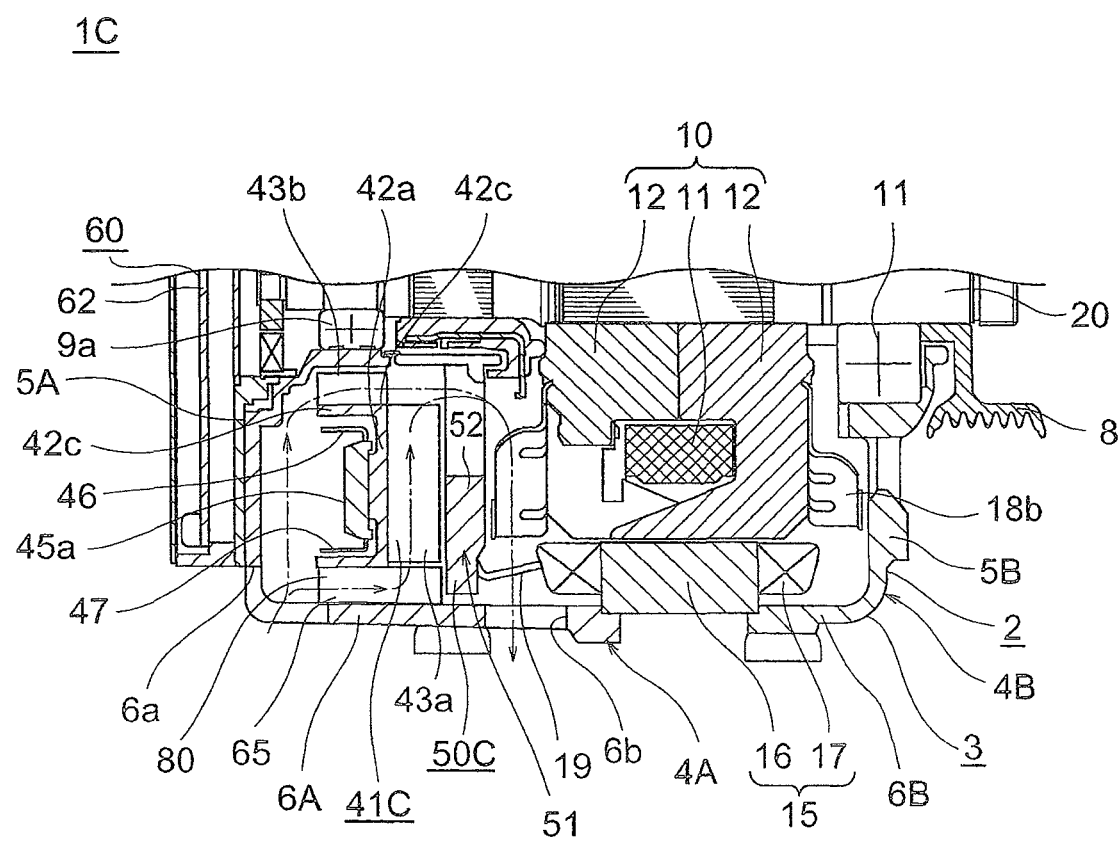
FIG. 6 is a partial cross section of a power supply unit-integrated dynamoelectric machine according to Embodiment 3 of the present invention.

FIG. 6 is a partial cross section of a power supply unit-integrated dynamoelectric machine according to Embodiment 3 of the present invention.

Moreover, in FIG. 6, portions identical to and corresponding to those in Embodiments 1 and 2 will be given identical numbering, and explanation thereof will be omitted.

In FIG. 6, a power supply unit-integrated dynamoelectric machine 1C is configured in a similar manner to that of the power supply unit-integrated dynamoelectric machine 1B except that a heatsink 41C is used instead of the heatsink 41B and in addition, a plurality of flexure preventing members 80 that are fixed integrally onto the tubular portion 6A of the rear bracket 4A are provided.

The base plate 42C of the heatsink 41C is configured in a similar manner to that of the base plate 42B except that the first guide portions 42b are omitted. A ventilation channel forming means 50C is configured by a partitioning member 51 and a second guide portion 42c.

The flexure preventing members 80 are formed so as to have flat shapes that have a predetermined thickness and a predetermined length using a material that has rigidity such as aluminum, etc.

The flexure preventing members 80 are fixed to inner circumferential surfaces of the tubular portion 6A such that longitudinal directions are oriented in an axial direction of the tubular portion 6A, and so as to project radially inward from the tubular portion 6A.

Now, in order to explain the effects obtained by mounting the flexure preventing members 80, a case will be explained in which a power supply unit-integrated dynamoelectric machine 1A on which flexure preventing members 80 have not been disposed is mounted to an automobile.

Figure 7A:
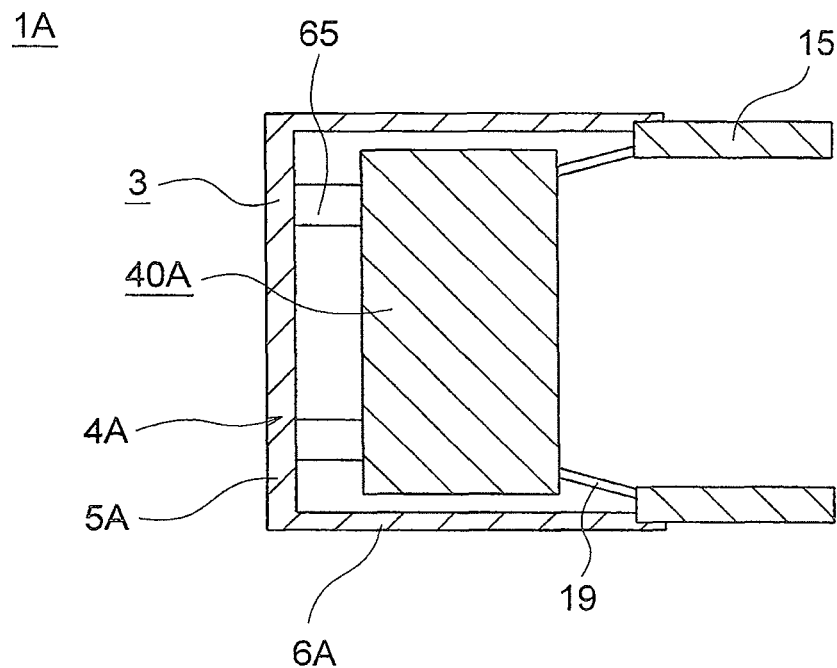
FIG. 7A is a partial cross section that schematically shows a rear bracket end of a power supply unit-integrated dynamoelectric machine to which a flexure preventing member has not been mounted.
Figure 7B:
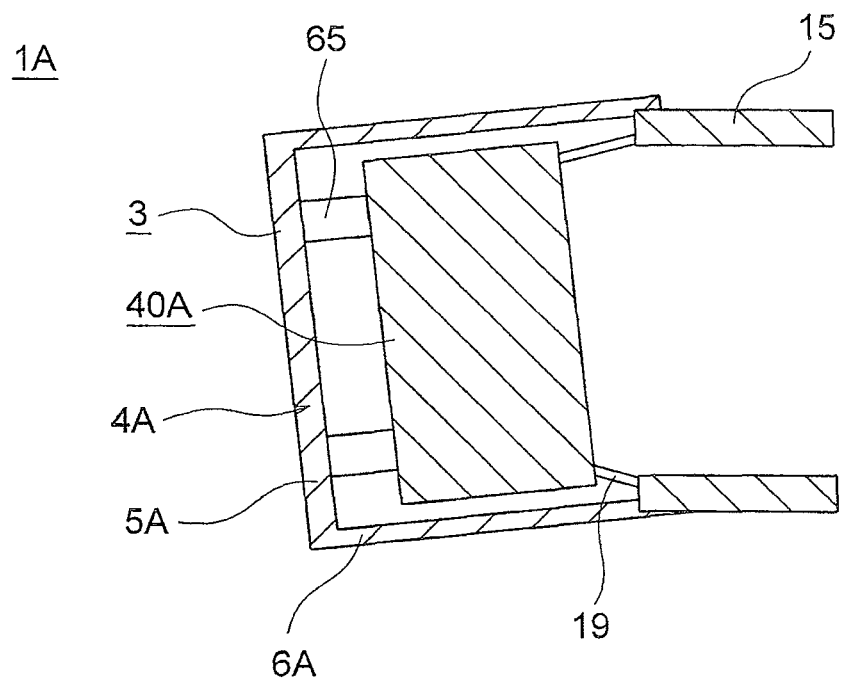
FIG. 7B is a partial cross section that schematically shows the rear bracket end of the power supply unit-integrated dynamoelectric machine to which the flexure preventing member has not been mounted.

FIGS. 7A and 7B are partial cross sections that schematically show a rear bracket end of a power supply unit-integrated dynamoelectric machine to which a flexure preventing member has not been mounted, FIG. 7A showing a state of the rear bracket during normal operation, and FIG. 7B showing a state in which the rear bracket has been bent by vibrations due to the running of the automobile.

The power supply unit-integrated dynamoelectric machine 1A is mounted to an automobile (not shown), for example, and if the automobile is stopped and stresses are not acting on the rear bracket 4A, the tubular portion 6A is disposed so as to be aligned with the central axis of the stator 15 that surrounds the rotor 10, as shown in FIG. 7A, for example.

Then, when the automobile runs and vibrates, the tubular portion 6A may be deformed such that the central axis skews, as shown in FIG. 7B.

As has been described above, the output wires 19 are coupled to relay terminals (not shown) that are mounted to the partitioning plate 52 of the power supply unit 40A, and because coupling portions of the output wires 19 to the relay terminals repeatedly expand and contract if the flexing deformation of the tubular portion 6A is repeated, this constitutes a cause of metal fatigue in the output wires 19.

If, on the other hand, the flexure preventing members 80 are mounted to the tubular portion 6A, it is known that deformation resistance between the two ends of the tubular portion 6A that is trying to bend will increase in proportion to the cube of the length of the flexure preventing members.

Consequently, according to the power supply unit-integrated dynamoelectric machine 1C according to Embodiment 3, the rear bracket 4A can be prevented from flexing when the power supply unit-integrated dynamoelectric machine 1C vibrates. Thus, because metal fatigue in the output wires 19 is suppressed, effects such as enabling vibration resistance of the power supply unit-integrated dynamoelectric machine 1C to be improved can be achieved, in addition to the effects of Embodiment 1.

Moreover, in Embodiment 3, the flexure preventing members 80 are explained as being prepared so as to have flat shapes, but may also be prepared so as to have block shapes.

The flexure preventing members 80 are not limited to being mounted to inner circumferential surfaces of the tubular portion 6A of the rear bracket 4A, and may also be mounted to outer circumferential surfaces.

Embodiment 4

Figure 8:
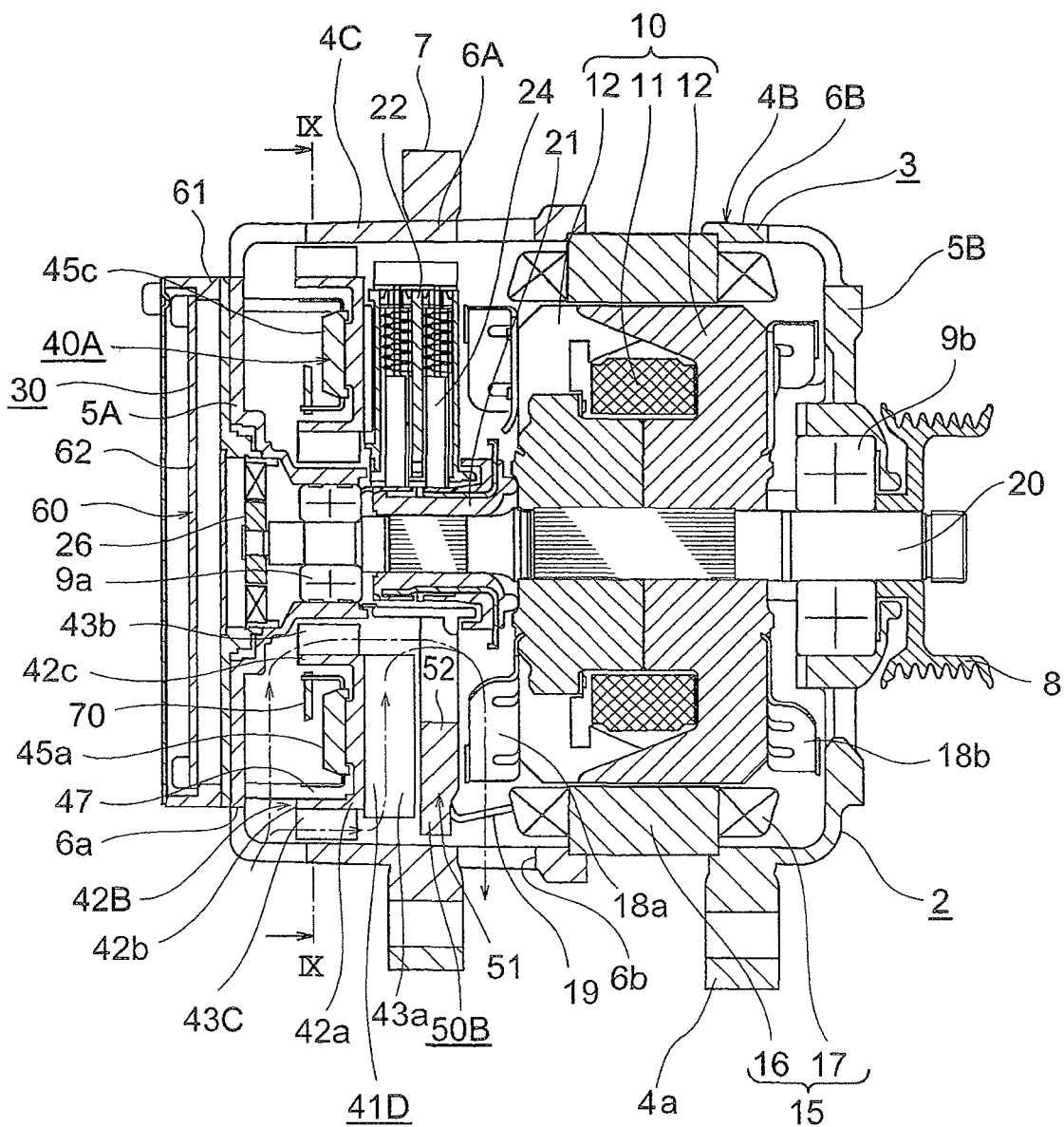
FIG. 8 is a cross section of a power supply unit-integrated dynamoelectric machine according to Embodiment 4 of the present invention.
Figure 9:
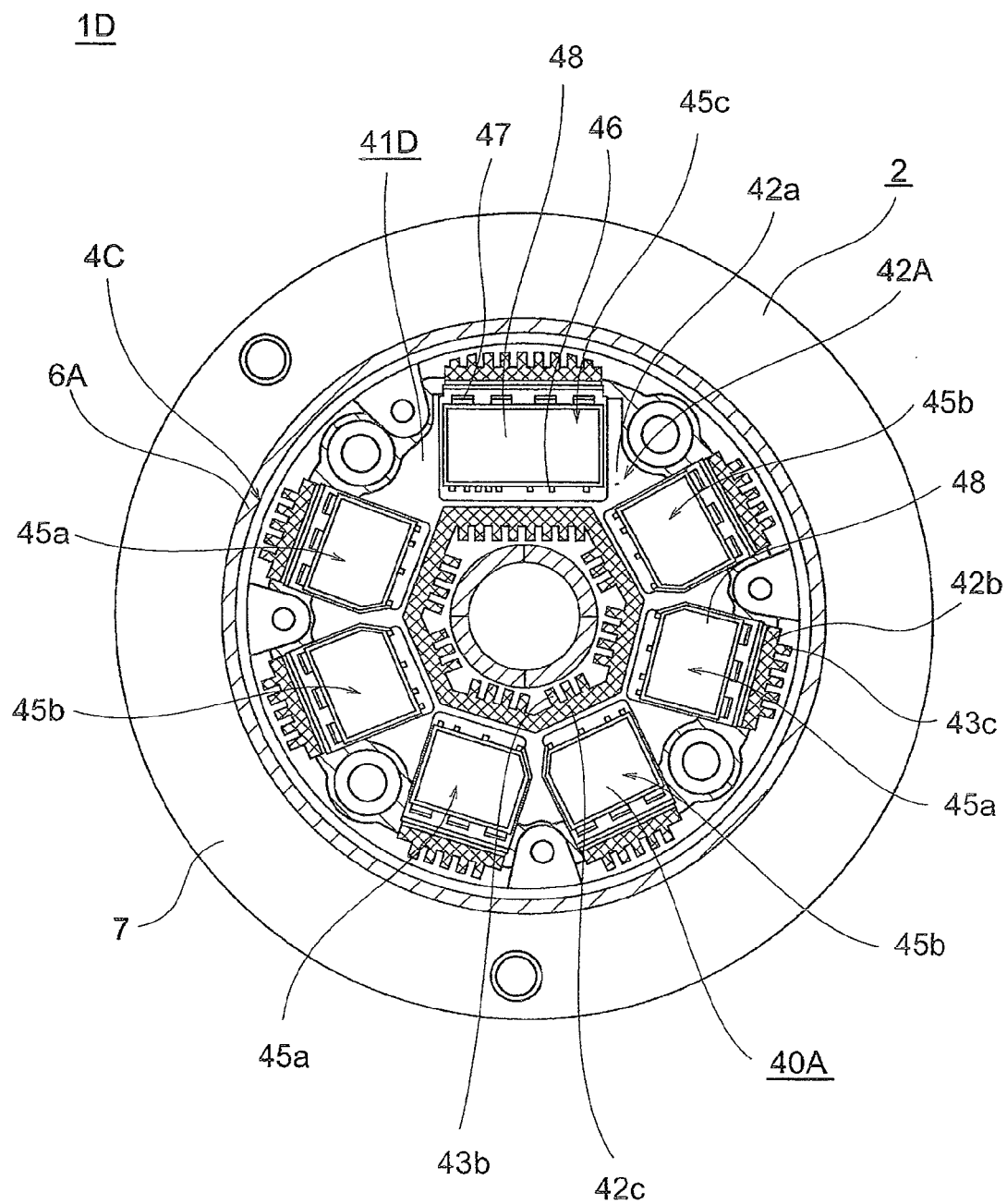
FIG. 9 is a cross section that is taken along Line IX-IX in FIG. 8 so as to be viewed from the direction of the arrows.
Figure 10:
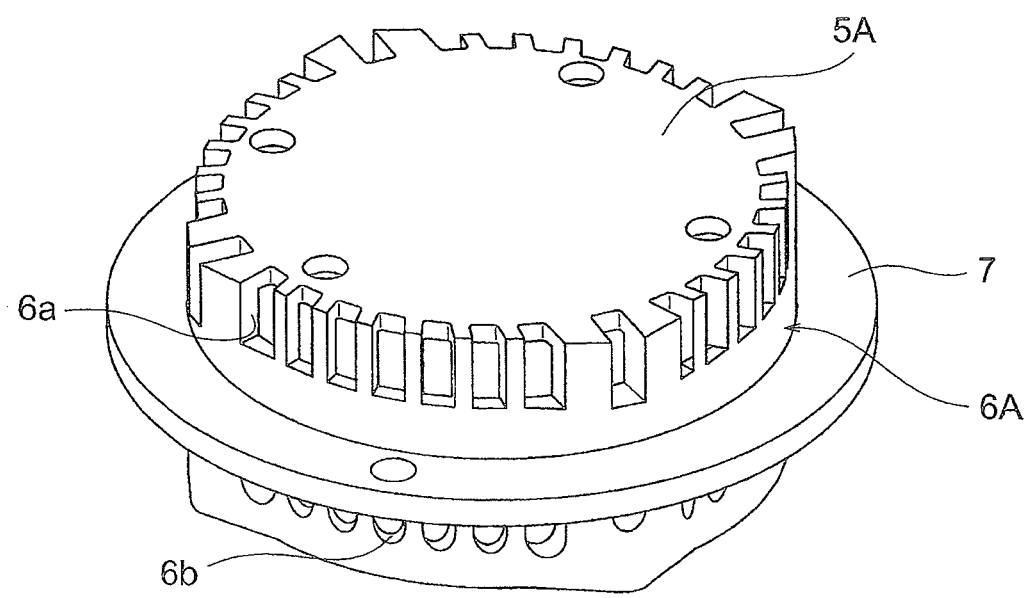
FIG. 10 is a perspective of a rear bracket of the power supply unit-integrated dynamoelectric machine according to Embodiment 4 of the present invention.

FIG. 8 is a cross section of a power supply unit-integrated dynamoelectric machine according to Embodiment 4 of the present invention, FIG. 9 is a cross section that is taken along Line IX-IX in FIG. 8 so as to be viewed from the direction of the arrows, and FIG. 10 is a perspective of a rear bracket of the power supply unit-integrated dynamoelectric machine according to Embodiment 4 of the present invention.

Moreover, in FIGS. 8 through 10, portions identical to and corresponding to those in the above embodiments will be given identical numbering, and explanation thereof will be omitted.

In FIGS. 8 through 10, a power supply unit-integrated dynamoelectric machine 1D is configured in a similar manner to that of the power supply unit-integrated dynamoelectric machine 1C except that a rear bracket 4C is used instead of the rear bracket 4A, and a heatsink 41D is used instead of the heatsink 41C.

The rear bracket 4C is configured in a similar manner to the rear bracket 4A except that a projecting portion 7 that projects radially outward from the tubular portion 6A is formed around an entire circumferential region of the tubular portion 6A between the air suction ports 6a and the air discharge ports 6b. First mounting apertures that have aperture directions that are oriented in an axial direction of the tubular portion 6A are formed on the projecting portion 7 so as to be separated circumferentially.

A mounting projecting portion 4a is disposed on an outer circumferential surface of the front bracket 4B so as to face the projecting portion 7, and second mounting apertures are formed on the mounting projecting portion 4a so as to be coaxial with the first mounting apertures.

The heatsink 41D is configured in a similar manner to the heatsink 41B except for having a plurality of third radiating fins 43c that project outward from the first guide portions 42b in a radially outward direction relative to the module mount portion 42a.

The plurality of third radiating fins 43c are arranged approximately circumferentially around the module mount portion 42a such that radiating surfaces are parallel to a direction that is perpendicular to the module mount portion 42a.

The heatsink 41D is supported inside the rear bracket 4C such that a configurative relationship between the module mount portion 42a and the rear bracket 4C is similar to the configurative relationship with the module mount portion 42a of the heatsink 41A. The projecting ends of the third radiating fins 43c are thereby directed toward the inner circumferential surface of the tubular portion 6A.

In a power supply unit-integrated dynamoelectric machine 1D that has been configured in the above manner, the first and second mounting apertures are used to fix the power supply unit-integrated dynamoelectric machine 1D to a wall portion of an automobile engine compartment (not shown), for example.

In the power supply unit-integrated dynamoelectric machine 1D, a first ventilation channel and a second ventilation channel are formed so as to take pathways that are similar to those of the first and second ventilation channels of the power supply unit-integrated dynamoelectric machine 1B, and the third radiating fins 43c are disposed inside the first ventilation channel.

When the fan 18a is rotated together with the rotation of the rotor 10, air that has been sucked inside the rear bracket 4C through the air suction ports 6a is divided and flows through the first ventilation channel and the second ventilation channel, and then flows so as to be discharged through the air discharge ports 6b.

A power supply unit-integrated dynamoelectric machine 1D according to Embodiment 4 has a projecting portion 7 that is disposed so as to protrude from an outer circumferential portion of a tubular portion 6A of a rear bracket 4A between air suction ports 6a and air discharge ports 6b so as to extend circumferentially. Air that has been discharged through the air discharge ports 6b is thereby suppressed from flowing around into the air suction ports 6a.

Consequently, cooling of the first and second power circuit modules 45a and 45b, the field circuit module 45c, the stator 15, and the rotor 10 can be performed even more effectively. In addition, because the third radiating fins 43c are additionally disposed so as to extend inside the first ventilation channel, radiation of heat that is generated by the first and second power circuit modules 45a and 45b and the field circuit module 45c is improved greatly, enabling the first and second power circuit modules 45a and 45b and the field circuit module 45c to be cooled even more effectively.

Moreover, the projecting portion 7 is explained as projecting over an entire circumferential region of the tubular portion 6A, but the effect that suppresses the air that is discharged through the air discharge ports 6b from flowing around into the air suction ports 6a remains even if a projecting portion is disposed so as to project from only some portions of the outer circumferential portion of the tubular portion 6A that are positioned between the air suction ports 6a and the air discharge ports 6b.

However, if the projecting portion 7 projects over the entire circumferential region of the tubular portion 6A, the first mounting apertures can be formed on the projecting portion 7 so as to be coaxial with the second mounting apertures even if the projecting positions of the mounting projecting portions 4a on which the second mounting apertures are formed are changed in the circumferential direction of the tubular portion 6B due to customer specifications, for example. In other words, the need to prepare a rear bracket 4C that is formed by a separate process each time the position of the mounting projecting portions 4a changes in the circumferential direction of the tubular portion 6B is eliminated.

Embodiment 5

Figure 11:
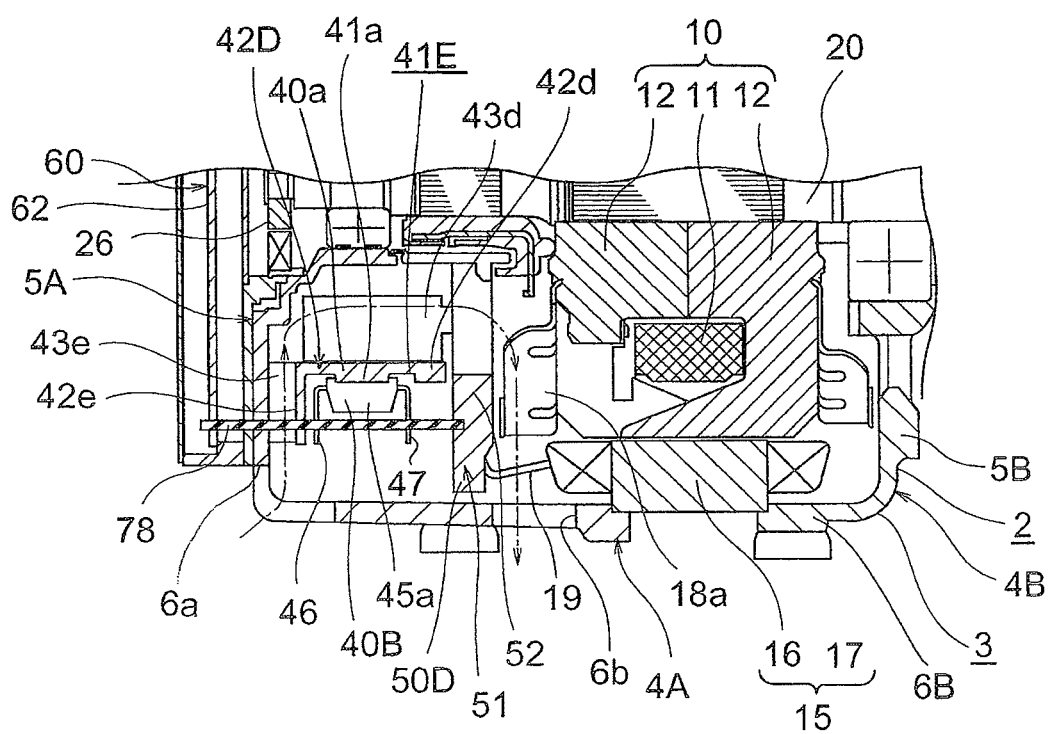
FIG. 11 is a partial cross section of a power supply unit-integrated dynamoelectric machine according to Embodiment 5 of the present invention.

FIG. 11 is a partial cross section of a power supply unit-integrated dynamoelectric machine according to Embodiment 5 of the present invention.

Moreover, in FIG. 11, portions identical to or corresponding to those in the above embodiments will be given identical numbering, and explanation thereof will be omitted.

In FIG. 11, a power supply unit-integrated dynamoelectric machine 1E has a power supply unit 40B instead of the power supply unit 40A, includes a wiring circuit board 78 that functions as a wiring member that performs signal transmission between the control circuit board 62 and the first power circuit modules 45a and electric power transmission between the first power circuit modules 45a and the stator 15, and the relay circuit board 70 is omitted. The rest of the configuration of the power supply unit-integrated dynamoelectric machine 1E is configured in a similar manner to the power supply unit-integrated dynamoelectric machine 1A.

The power supply unit 40B includes: six first power circuit modules 45a; a field circuit module 45c; and a heatsink 41E that is constituted by a plurality of divided heatsinks 41a to which each of the first power circuit modules 45a and the field circuit module 45c are respectively mounted.

Either a first power circuit module 45a or the field circuit module 45c is mounted to each of the divided heatsinks 41a. First divided units 40a are constituted by the first power circuit modules 45a and the divided heatsinks 41a to which the first power circuit modules 45a are mounted, and a second divided unit (not shown) is constituted by the field circuit module 45c and the divided heatsink 41a to which the field circuit module 45c is mounted.

The divided heatsinks 41a include: a base plate 42D that is composed of a flat module mount portion 42d and a third guide portion 42e that are perpendicular to each other, and that has an L-shaped cross section in a width direction; and a plurality of fourth radiating fins 43d and a plurality of fifth radiating fins 43e that project outward from the module mount portion 42d and the third guide portion 42e.

A front surface of the module mount portion 42d near where the third guide portion 42e is disposed so as to extend constitutes a mounting surface to which a first power circuit module 45a or the field circuit module 45c is mounted, and the plurality of fourth radiating fins 43d project outward from a rear surface of the module mount portion 42d so as to be arranged in a width direction of the base plate 42D. The plurality of fifth radiating fins 43e project outward from the rear surface of the third guide portion 42e so as to be arranged in a width direction of the base plate 42D.

The plurality of first power circuit modules 45a are mounted to the mounting surfaces of the plurality of module mount portions 42d. Here, the first power circuit modules 45a are mounted to the mounting surfaces of the module mount portions 42d such that second lead terminals 47 are disposed near leading ends of the module mount portions 42d, and first lead terminals 46 near base ends of the module mount portions 42d.

The field circuit module 45c is mounted to the module mount portion 42d of a divided heatsinks 41a in a similar manner.

A ventilation channel forming means 50D is configured by a partitioning member 51, the module mount portions 42d, and the third guide portions 42e.

The first divided units 40a and the second divided unit that constitute the power supply unit 40B are supported by the rear bracket 4A so as to be disposed between the fan 18a and the bottom portion 5A of the rear bracket 4A such that the mounting surfaces of the module mount portions 42d are parallel to an axial direction of the rotating shaft 20 and so as to be spaced apart from each other in a circumferential direction of the tubular portion 6A. Although not shown in detail, the divided heatsinks 41a of the first and second divided units are made to have identical electric potential.

The first divided units 40a and the second divided unit are disposed such that the mounting surfaces of the module mount portions 42d are made to face an inner surface of the tubular portion 6A and leading ends of the fifth radiating fins 43e are oriented toward the bottom portion 5A. Here, the fourth radiating fins 43d are oriented toward a center of the tubular portion 6A. The air suction ports 6a of the rear bracket 4A are positioned so as to have opening portions that are nearer to the bottom portion 5A than the power supply unit 40B.

A partitioning member 51 is disposed between the power supply unit 40B and the fan 18a such that the power supply unit 40B and a radially inner side of the fan 18a communicate.

In a power supply unit-integrated dynamoelectric machine 1E that has been configured in this manner, as indicated by dotted chain lines with arrows in FIG. 11, a third ventilation channel that extends from the air suction ports 6a to the air discharge ports 6b is configured inside the rear bracket 4A by the base plate 42D, the ventilation channel forming means 50D, the rotor 10, and the stator 15.

The third ventilation channel has a pathway that extends from the air suction ports 6a to a radially-inner side of the fan 18a so as to pass between the bottom portion 5A of the rear bracket 4A and the third guide portions 42e, head from the front surface side of the module mount portion 42d toward the rear surface, and in addition, pass through a space between the wall portion of the rear bracket 4A and the slip rings 21 that surrounds the rear surface of the module mount portion 42d and a first end portion of the rotating shaft 20. In addition, the third ventilation channel has a pathway that passes through a space between the rotor 10 and stator 15 and the partitioning member 51 to reach the air outlets 6b. The fourth radiating fins 43d and the fifth radiating fins 43e are disposed so as to extend inside the third ventilation channel which is formed in this manner.

When the fan 18a is rotated, air flows radially outward from radially inside the fan 18a and is discharged through the air outlets 6b, forming negative pressure radially inside the fan 18a. Air that is sucked in through the air suction ports 6a by the negative pressure that has been generated radially inside the fan 18a is led to the negative pressure portion of the fan 18a so as to pass through between the fifth radiating fins 43e and the fourth radiating fins 43d, and is then sent to the air discharge ports 6b and is discharged through the air discharge ports 6b.

Because heat that has been generated by the first power circuit modules 45a and transferred to the fourth radiating fins 43d and the fifth radiating fins 43e and heat that is generated by the stator 15 and the rotor 10 is taken by the air that passes through the third ventilation channel, the first power circuit modules 45a, the field circuit module 45c, the rotor 10, and the stator 15 are cooled.

According to the power supply unit-integrated dynamoelectric machine 1E according to Embodiment 5, a power supply unit 40B is constituted by a plurality of divided heatsinks 41a to each of which first power circuit modules 45a and a field circuit module 45c are respectively mounted.

The power supply unit 40B is disposed between the fan 18a and the bottom portion 5A of the rear bracket 4A. Here, on the rear bracket 4A, air discharge ports 6b are formed on portions that are positioned radially outside the fan 18a, and air suction ports 6a are formed so as to have openings nearer to the bottom portion 5A than the power supply unit 40B.

A partitioning member 51 is disposed between the power supply unit 40B and the fan 18a such that the power supply unit 40B and a radially inner side of the fan 18a communicate. A third ventilation channel in which air sucked in through the air suction ports 6a by negative pressure generated radially inside the fan 18a when the fan 18a rotates is sent to the air discharge ports 6b after being directed to the negative pressure portion of the fan 18a is configured by disposing the partitioning member 51.

Divided heatsink 41a each include: a flat module mount portion 42d to a surface of which is mounted either a first power circuit module 45a or a field circuit module 45c; and fifth radiating fins 43e that are disposed so as to protrude from a rear surface of the module mount portion 42d, and a plurality of divided heatsinks 41a are disposed such that the module mount portions 42d are parallel to an axial direction of the rotating shaft 20, and the fifth radiating fins 43e extend inside the third ventilation channel.

As explained above, a power supply unit 40B is disposed inside a rear bracket 4A, air suction ports 6a are disposed on portions of the rear bracket 4A that are nearer to the bottom portion 5A than the power supply unit 40B, and air discharge ports 6b are disposed on portions of the rear bracket 4A that are nearer to a rotor 10 than the power supply unit 40B. Because of this, distance between the air suction ports and the air discharge ports can be lengthened without increasing the size of the power supply unit-integrated dynamoelectric machine 1E, enabling similar effects to those of the power supply unit-integrated dynamoelectric machine 1A also to be achieved by the power supply unit-integrated dynamoelectric machine 1E.

In addition, by disposing mounting surfaces 42f parallel to an axial direction of the rotating shaft 20, area of the mounting surfaces for mounting the first power circuit modules 45a or the field circuit module 45c can be widened compared with when mounted to the mounting surfaces of the module mount portion 42a that are perpendicular to an axial direction of the rotating shaft 20 that have been described above.

Now, if first and second power circuit modules 45a and 45b and a field circuit module 45c are mounted to a module mount portion 42a that is disposed so as to be perpendicular to an axial direction of the rotating shaft 20, as in the power supply unit-integrated dynamoelectric machine 1A, for example, it may be necessary to adapt the external shapes of the sealing bodies 48 of the first and second power circuit modules 45a and 45b and the field circuit module 45c, as shown in FIG. 1, in order to reduce the area of the mounting surface of the module mount portion 42a required to mount the first and second power circuit modules 45a and 45b.

As has been mentioned above, the first and second power circuit modules 45a and 45b are prepared so as to have a mirror symmetrical construction. The external shapes of the sealing bodies 48 of the first and second power circuit modules 45a and 45b are approximately rectangular when viewed from the front surface of the sealing bodies 48, but a portion of a corner portion is eased as follows. Specifically, the sealing bodies 48 of the first and second power circuit modules 45a and 45b are configured so as to have shapes in which easing has been applied to mutually-adjacent corner portions on a radially inner side of the module mount portion 42a when pairs of first and second power circuit modules 45a and 45b are arranged in the circumferential direction of the module mount portion 42a such that the first lead terminals 46 are oriented toward the radially inner side of the module mount portion 42a, as shown in FIG. 2.

Thus, as shown in FIG. 2, using first and second power circuit modules 45a and 45b that have eased portions formed on the sealing bodies 48, the power circuit modules 45a and 45b can be placed in closer proximity without colliding than those on which eased portions are not formed. Because of this, the area of the mounting surface required for mounting the power circuit modules 45a and 45b is reduced, enabling the first and second power circuit modules 45a and 45b to be mounted to a module mount portion 42a that has a narrower mounting surface.

If the sealing bodies 48 of the first and second power circuit modules 45a and 45b are formed in the above manner, it is necessary to configure the power circuit modules 45a and 45b so as to have a mirror symmetrical construction. Because of that, two different kinds of mold are required to prepare the first and second power circuit modules 45a and 45b by molding.

In contrast to that, the divided heatsinks 41a that constitute the heatsink 41E are configured such that the module mount portions 42d can be disposed parallel to the rotating shaft 20, enabling the area of the mounting surfaces of the module mount portions 42d for mounting the power circuit modules 45a to be widened. Consequently, it is no longer necessary to make the sealing bodies 48 of the power circuit modules different shapes to reduce the area of the mounting surfaces on the module mount portions 42d required for mounting the first power circuit modules 45a. In other words, it is no longer necessary to use first and second power circuit modules 45a and 45b that have sealing bodies 48 that have different external shapes.

Thus, because it is sufficient simply to adopt identical first power circuit modules 45a for the plurality of power circuit modules, eliminating a need for a mold required for preparing the second power circuit modules 45b by molding, reductions in costs for manufacturing the power supply unit-integrated dynamoelectric machine 1E are enabled.

When the module mount portions 42d are disposed so as to be parallel to the rotating shaft 20, disposing the first lead terminals 46 and the second lead terminals 47 on a line that joins the control circuit board 62 and the partitioning plate 52 is facilitated.

For example, from the control circuit board 62, a single long wiring circuit board 78 is disposed so as to extend linearly from the first lead terminals 46 to the partitioning plate 52, and a wiring pattern is formed on the wiring circuit board 78 in advance that connects the first lead terminals 46 and the control signal transmission terminals of the control circuit board 62, and that also connects the second lead terminals 47 and the relay terminals that are mounted to the partitioning plate 52 to which the output wires 19 are connected. It is thereby possible to make connections between the control circuit board 62 and the first lead terminals 46, and connections between the second lead terminals 47 and the output wires 19, using a wiring circuit board 78 that can be prepared in a single step, enabling reductions in costs for manufacturing the power supply unit-integrated dynamoelectric machine 1E.

Because the plurality of divided heatsinks 41a and the rear bracket 4A are connected so as to have identical electric potential, even if the rear bracket 4A is deformed by a certain amount and contacts the heatsink 41A, the divided heatsinks 41a and the rear bracket 4A will no longer short circuit. The divided heatsinks 41a can thereby be enlarged and disposed inside the rear bracket 4A so as to eliminate gaps with the inner surface of the rear bracket 4A, improving heat radiating performance of the divided heatsinks 41a.

Moreover, in Embodiment 5, third guide portions 42e and fifth radiating fins 43e are explained as being disposed, but the third guide portions 42e and the fifth radiating fins 43e may also be omitted.

Figure 12:
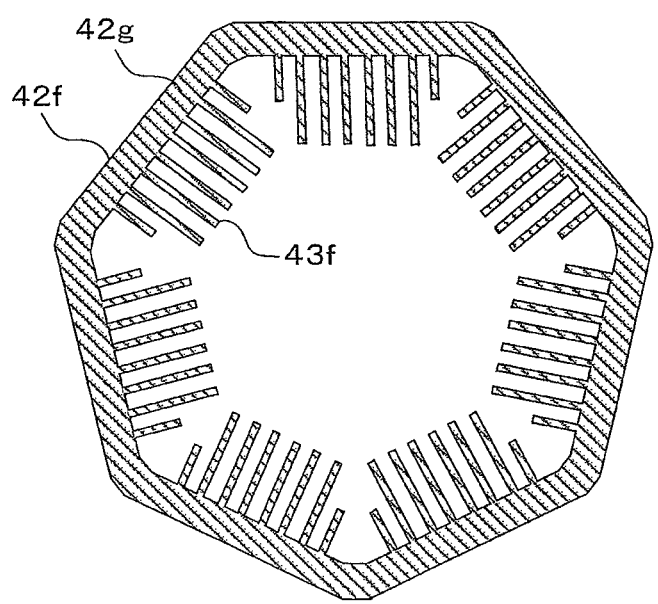
FIG. 12 is an exploded perspective that shows another preferred variation of a heatsink of the power supply unit-integrated dynamoelectric machine according to Embodiment 5 of the present invention.

A heatsink 41E that is constituted by a plurality of divided heatsinks 41a that each have flat module mount portions 42d is explained as being used, but a heatsink that has a tubular module mount portion as shown in FIG. 12 below can also be used for the heatsink.

FIG. 12 is an exploded perspective that shows another preferred variation of a heatsink of the power supply unit-integrated dynamoelectric machine according to Embodiment 5 of the present invention.

In FIG. 12, a heatsink 41F has: a module mount portion 42g that is formed so as to have a tubular shape that has a cross section that has an external shape that is approximately heptagonal; and sixth radiating fins 43f that are disposed so as to protrude from the module mount portion 42g.

Each of seven faces that constitute an outer circumferential portion of the module mount portion 42g constitutes a mounting surface 42f for mounting any of the power circuit modules 45a and 45b or the field circuit module 45c. The sixth radiating fins 43f are disposed so as to project from inner circumferential portions of the module mount portion 42g. The sixth radiating fins 43f are disposed so as to project perpendicularly from the inner circumferential portions of the module mount portion 42g so as to be spaced apart from each other over an entire longitudinal region of the module mount portion 42g.

A power supply unit (not shown) is constituted by: the heatsink 41F; and the first power circuit modules 45a and the field circuit module 45c that are mounted so as to be distributed over the seven mounting surfaces 42f.

Similar effects to those of the power supply unit-integrated dynamoelectric machine 1E can also be achieved by a power supply unit-integrated dynamoelectric machine that uses a power supply unit that is configured in this manner instead of the power supply unit 40B.

Specifically, the heatsink 41F is disposed such that the module mount portion 42g surrounds the rotating shaft 20, and the mounting surfaces 42f are disposed parallel to the rotating shaft 20. Area of the mounting surfaces 42f of the module mount portion 42g for mounting the first power circuit modules 45a and the field circuit module 45c can also be widened using a power supply unit-integrated dynamoelectric machine that is configured in this manner in a similar manner to one in which the heatsink 41E is constituted by divided heatsinks 41a. Thus, similar effects to those of the power supply unit-integrated dynamoelectric machine 1E can also be achieved using a power supply unit-integrated dynamoelectric machine that uses the heatsink 41F.

Moreover, in this embodiment, the heatsink is explained as being configured so as to have a tubular shape, but the heatsink may also have a C-shaped cross section.

The mounting surfaces 42f are explained as being configured on outer circumferential portions of the module mount portion 42g, and the sixth radiating fins 43f are disposed so as to project from an inner circumferential portion, but the mounting surfaces 42f may also be configured on the inner circumferential portion of the module mount portion 42g, and the sixth radiating fins 43f disposed so as to project from the outer circumferential portion.

What is claimed is:

1. A power supply unit-integrated dynamoelectric machine comprising:
   a dynamoelectric machine main body that comprises:
   a housing that comprises a rear bracket and a front bracket that are each formed so as to have a bottom portion and a tubular portion, and that are coupled such that opening portions face each other;
   a rotor that is fixed coaxially to a rotating shaft that has a first end region and a second end region that are rotatably supported by said rear bracket and said front bracket;
   a stator that is disposed so as to surround said rotor, and that is held between open end portions of said rear bracket and said front bracket; and
   a fan that is mounted to a first end portion of said rotor; and
   a power supply unit comprising:
   a power circuit module and a field circuit module that supply electric power to said stator and said rotor;
   a base plate; and
   a heatsink to which said power circuit module and said field circuit module are mounted, said power supply unit being mounted integrally onto said dynamoelectric machine main body, wherein:
   said power supply unit is disposed between a radially inner side of said fan and a bottom portion of said rear bracket;
   said rear bracket comprises:
   an air discharge port that is formed on a portion that is positioned radially outside said fan; and
   an air suction port that has an opening nearer to said bottom portion than said power supply unit;
   said power supply unit-integrated dynamoelectric machine further comprises a partitioning member disposed between said power supply unit and said fan so as to allow communication of said power supply unit and the radially inner side of said fan, and that configures a ventilation channel in which air is sucked in through said air suction port by suction pressure that is generated on a radially inner side of said fan, and when said fan rotates the air is directed to a suction pressure portion of said fan so that it is passed through the radially inner side of the fan and subsequently is sent to said air discharge ports;
   said base plate has:
   a flat module mount portion to a front surface of which said power circuit module and said field circuit module are mounted; and
   first guide portions are disposed so as to protrude from edge portions radially outside portions,
   said heatsink includes a first radiating fin that is disposed so as to protrude from a rear surface of said flat module mount portion,
   said heatsink being disposed such that said first radiating fin extends inside said ventilation channel; and
   said first guide portions guide the air that has been sucked in through said air suction port between the rear surface of said flat module mount portion and the partitioning member, thereby the air that has been sucked in passes through an outer circumferential portion of said flat module mount portion, flows radially inward between the rear surface of said flat module mount portion and the partitioning member, and is led to the suction pressure portion of said fan.

2. A power supply unit-integrated dynamoelectric machine according to claim 1, wherein:
   said module mount portion is prepared so as to have a flat ring shape;
   said heatsink is disposed such that said first radiating fin is oriented toward said fan, and said module mount portion is perpendicular to an axial direction of said rotating shaft so as to surround said rotating shaft;
   said partitioning member is disposed between an outer circumferential side of said fan and said first radiating fin; and
   said ventilation channel comprises:
   a first ventilation channel that extends from said air suction port, passes an outer circumferential portion of said module mount portion, flows radially inward between said rear surface of said module mount portion and said partitioning member, passes through said suction pressure portion of said fan, and then passes between said partitioning member and said rotor to said air discharge port; and
   a second ventilation channel that flows from said air suction port radially inward on a front surface side of said module mount portion, passes through an inner circumferential portion of said module mount portion from said front surface side of said module mount portion, flows toward said rotor, and merges with said first ventilation channel.

3. A power supply unit-integrated dynamoelectric machine according to claim 2, further comprising a first guide portion that extends from said outer circumferential portion of said module mount portion toward said floor portion so as to be spaced apart from said rear bracket, and that guides air that is sucked in through said air suction port between said rear surface of said module mount portion and said partitioning member.

4. A power supply unit-integrated dynamoelectric machine according to claim 2, further comprising a second guide portion that extends toward said floor portion from said inner circumferential portion of said module mount portion, and that guides air that has been directed along said front surface side of said module mount portion to said inner circumferential portion toward said rear surface of said module mount portion.

5. A power supply unit-integrated dynamoelectric machine according to claim 4, wherein said second guide portion is prepared integrally on said module mount portion, and a second radiating fin is disposed so as to project from said second guide portion so as to extend inside said second ventilation channel.

6. A power supply unit-integrated dynamoelectric machine according to claim 3, wherein said first guide portion is prepared integrally on said module mount portion, and a third radiating fin is disposed so as to project from said first guide portion so as to extend inside said first ventilation channel.

7. A power supply unit-integrated dynamoelectric machine according to claim 1, wherein said power circuit module and said field circuit module are electrically insulated from said heatsink, and said heatsink and said rear bracket are made to have identical electric potential.

8. A power supply unit-integrated dynamoelectric machine according to claim 1, further comprising a flexure preventing member, said flexure preventing member being prepared using a material that has rigidity, and being mounted to a wall surface of said rear bracket so as to extend in an axial direction of said rotating shaft.

9. A power supply unit-integrated dynamoelectric machine according to claim 1, further comprising a projecting portion, said projecting portion being disposed so as to project from an outer circumferential portion of said rear bracket between said air suction port and said air discharge port so as to extend circumferentially.

* * * * *